E. T. WILLIAMS.
ICE MAKING AND HARVESTING APPARATUS.
APPLICATION FILED NOV. 3, 1910.

1,051,299.

Patented Jan. 21, 1913.
4 SHEETS—SHEET 1.

E. T. WILLIAMS.
ICE MAKING AND HARVESTING APPARATUS.
APPLICATION FILED NOV. 3, 1910.

1,051,299.

Patented Jan. 21, 1913.

E. T. WILLIAMS.
ICE MAKING AND HARVESTING APPARATUS.
APPLICATION FILED NOV. 3, 1910.

1,051,299.

Patented Jan. 21, 1913.
4 SHEETS—SHEET 3.

Witnesses
W. A. Williams
H. L. Imirie

Inventor
Edward T. Williams

By
Robertson & Johnson
Attorneys

E. T. WILLIAMS.
ICE MAKING AND HARVESTING APPARATUS.
APPLICATION FILED NOV. 3, 1910.

1,051,299.

Patented Jan. 21, 1913.

UNITED STATES PATENT OFFICE.

EDWARD T. WILLIAMS, OF BROOKLYN, NEW YORK.

ICE MAKING AND HARVESTING APPARATUS.

1,051,299.

Specification of Letters Patent. Patented Jan. 21, 1913.

Application filed November 3, 1910. Serial No. 590,518.

*To all whom it may concern:*

Be it known that I, EDWARD T. WILLIAMS, a citizen of the United States, and a resident of Brooklyn, in the county of Kings and State of New York, have invented certain new and useful Improvements in Ice Making and Harvesting Apparatus, of which the following is a specification.

My invention relates to improvements in ice making and harvesting apparatus and has to do with the arrangement of piping for serving individual molds or mold groups with fluids for freezing, thawing, etc., and with the provision of means for simultaneously controlling the connections between a plurality of the serving systems and a given mold or mold group. It also has to do with the molds and particularly with the construction of the bottoms thereof, the principal features being, first, the provision of a closed auxiliary thawing chamber beneath the individual molds to insure the prompt release of the ice cake, second, the extension of the depending shells inclosing and lining the holes in the bottoms of the molds to a point below the lower edge of the inclosing walls depending from the mold bottoms and, in the system illustrated herein, below the top of the tank, to prevent air rejected from one mold from finding its way into another and unduly agitating the water therein, and third, the provision of means for delivering agitating air to the water in the tank so constructed and located as to be controlled by the freezing ice cake as it forms to diminish the supply of agitating air automatically and preferably gradually, the air pressure supplied to the air delivering devices being constant and the supply of air to the interior of the given mold being variable automatically to meet its changing requirements. I have shown these improvements as embodied in the system illustrated in my co-pending application Ser. No. 569,968, filed July 1, 1910, in connection with which they are particularly valuable, but it will be apparent that they are applicable also to the system shown in my co-pending applications Ser. No. 554,943, filed April 12, 1910, and Ser. No. 566,660, filed June 13, 1910, and in large part to other systems also.

The above is merely an outline and other advantageous features of my invention will be pointed out hereinafter in the more detailed description.

My invention therefore consists in the subject matter, embodiments of which are illustrated and described herein, and in the matter set forth in the appended claims.

Referring to the drawings: Fig. 7 is a vertical longitudinal section of another modified form.

Figure 1:
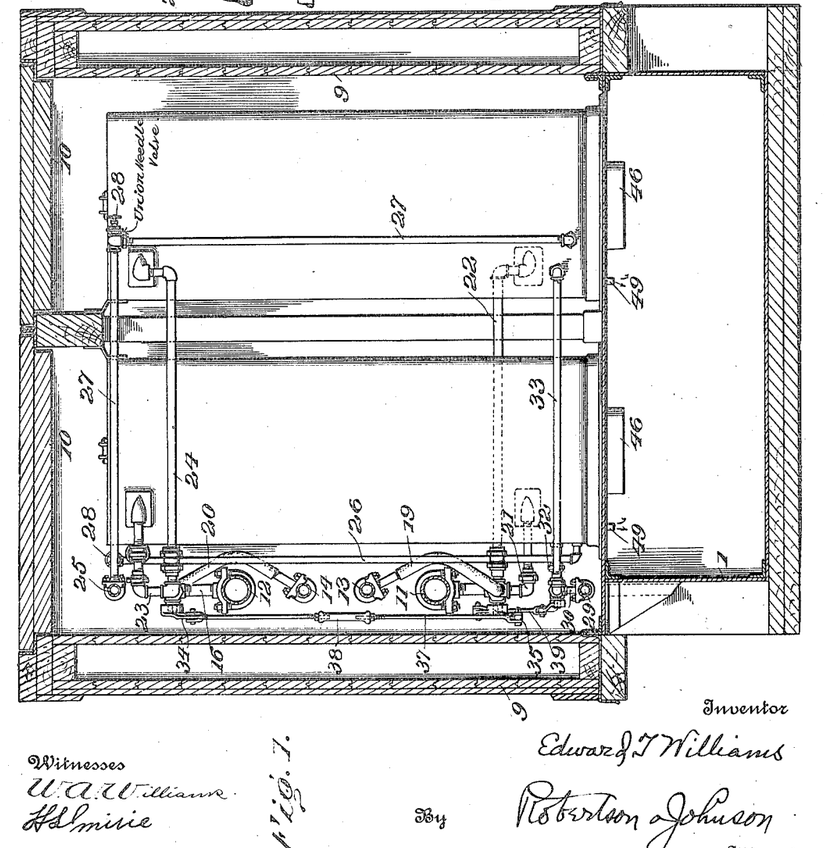
Figure 1 is a transverse vertical section through the tank, molds and serving headers.
Figure 2:
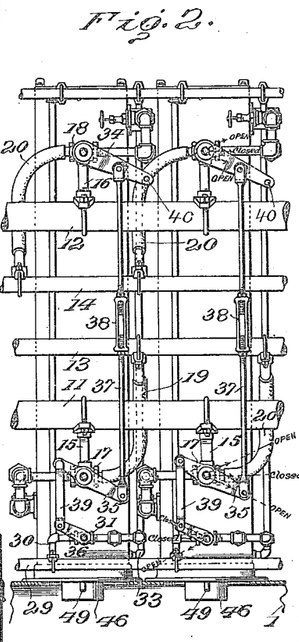
Fig. 2 is an end elevation.
Figure 3:
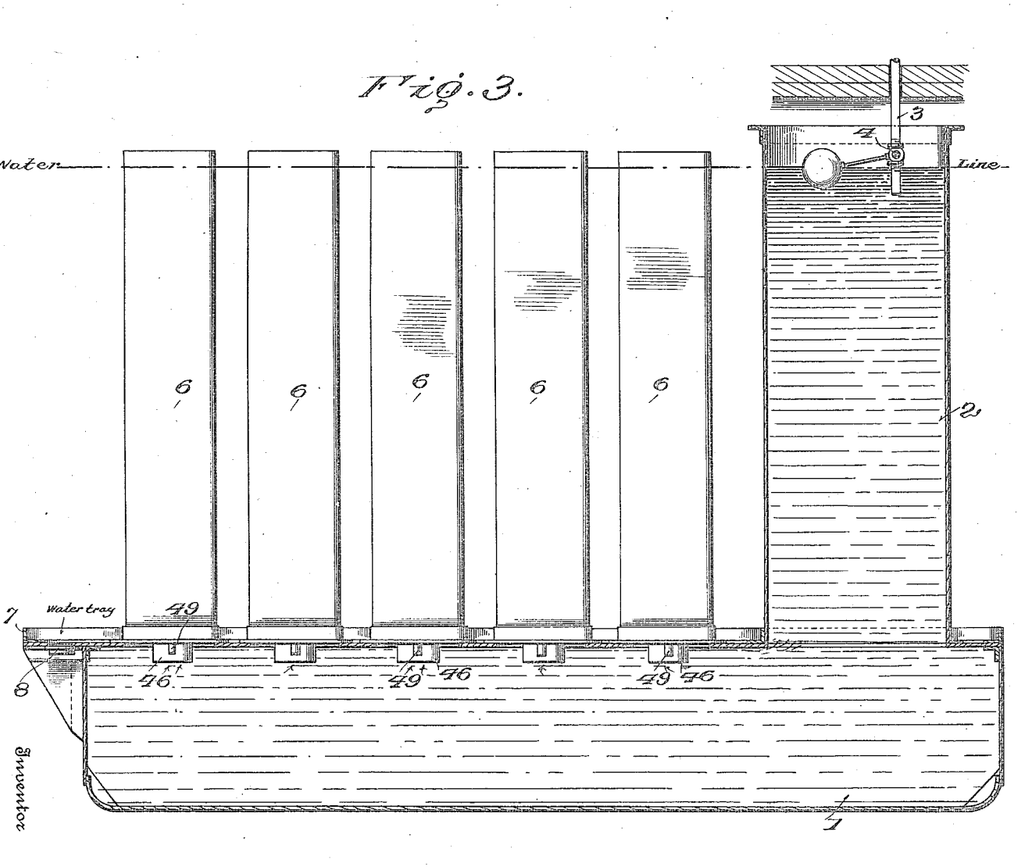
Fig. 3 is a longitudinal vertical section more or less diagrammatic in character.

Referring to Figs. 1, 2 and 3: 1 is a shallow water tank provided with a stand pipe or reservoir 2 fed by a supply pipe 3, controlled by a float valve 4. On the top of the tank are molds having inner walls 5 and outer walls 6 forming between them a jacket for freezing and thawing fluid as illustrated in my other applications above referred to. These molds are secured to the top of the tank by water tight connections and are provided with bottoms having holes by which they are in communication with the water in the tank and are automatically filled to the level of the water in the stand pipe. The novel features of the bottom structure of these molds will be referred to hereinafter. It should be stated now, however, that as in the system illustrated in my application Ser. No. 569,968, the bottoms of the molds are above the top of the tank, when employed in a system of this character, so as to leave working space between the said bottoms and tank top for connections, etc., and to permit the headers to be located above the top of the tank. I prefer to provide the top of the tank with an upstanding edge flange 7 to retain any water which may gather on the top, a drainage plug 8 being conveniently employed. I prefer to use an insulating cabinet 9 around the space occupied by the molds as indicated. The molds are open at the top so that the ice blocks can be withdrawn therefrom, the cabinet having removable covers 10. It will be understood, however, that individual covers might be provided for the molds which would still be open at the top in the sense of the words as used herein. Systems for circulating fluids, as brine, in ice making apparatus including piping, a pump, etc., are well known in the art, and complete systems for circulating freezing fluid and for circulating thawing fluid, including apparatus for heating the one and for cooling the other, are illustrated and described in my aforesaid co-pending application, Ser. No. 554,943, and nothing would be gained by duplicating such illustration and description in this application.

For serving the molds with freezing and thawing fluid I may provide various arrangements of piping as suggested in my applications above referred to. These may be constructed to enable the molds to be controlled individually or in groups as desired. I have illustrated an arrangement in which the molds are operated in pairs.

11 is a freezing fluid supply header and 12 a freezing fluid return header.

13 is a thawing fluid supply header and 14 a thawing fluid return header.

Pipes 15 and 16 respectively connect the freezing fluid supply header 11 and the freezing fluid return header 12 with the valve casings 17 and 18 respectively. Flexible pipes 19 and 20, preferably of lead, respectively connect the thawing fluid supply pipe 13 and the thawing fluid return pipe 14 to the said casings 17 and 18 respectively. As shown it is preferred to arrange the headers in the same vertical plane along one side of a row or rows of molds, suitable racks not shown being provided to support them. The desirability of flexible pipes as connections will be apparent in securing this arrangement and to permit expansion and contraction. The valve casings 17 are connected to the inlets of the mold jackets by pipes 21, 22 and the valve casings 18 are connected to the outlets of the mold jackets by the pipes 23, 24, each pipe of a pair leading, in the construction illustrated, to the jacket of a mold in a different row. I also employ a header 25 for agitating air having connections 26, 27 to individual molds of adjacent rows. Needle valves 28 constitute a hand adjustment for these connections. This adjustment need usually be made but once. I have shown this header as located in the same plane as the headers above described but above the same.

29 is an auxiliary thawing fluid supply header separate from the thawing fluid headers above referred to, and preferably located below the other headers as indicated. This header is connected by the pipe 30 to the valve casing 31 and this casing is connected by the pipes 32, 33 with auxiliary thawing chambers of molds in adjacent rows.

The means by which the connections between the various headers and particular molds or groups of molds are controlled will now be described.

In each valve casing 17, 18 is located a three way valve of well known construction, and in valve casing 31 a two way valve, and to each of these valves is secured an operating arm 34, 35 and 36, respectively reading from the top to bottom in Figs. 1 and 2. A link 37 adjustable by means of a turnbuckle 38 connects arms 34 and 35, while the part of the arm 35 projecting on the other side of the valve from that to which the said link is connected, is joined by a link 39 to operating arm 36. The relation of the valves is such that when the operating arms are horizontal all connections are closed and that, on depressing operating arm 35, the valves are simultaneously thrown to freezing position and on the raising of the arm 34 above the horizontal the valves are simultaneously thrown to thawing position. The connection between the auxiliary thawing header and the mold is of course closed except during thawing. For convenience in effecting this operation, the arms 34 are provided with holes 40 into which the operator may insert the end of a suitably shaped hook and either depress or lift the operating arm. The desirability of controlling these valves simultaneously and of making it impossible for the freezing and thawing systems to be accidentally connected to each other is apparent. In my co-pending application, Ser. No. 566,660, above mentioned, I show an arrangement in which by grouping the connections I am enabled to effect control of the freezing, thawing and auxiliary thawing devices of a given mold by operating only two valves. The arrangement just mentioned is a step in advance of the construction described in said application. It will be apparent that if for any reason a set of additional valves or sets of additional valves were desired they could be joined to the operating systems described for simultaneous operation therewith.

Figure 4:
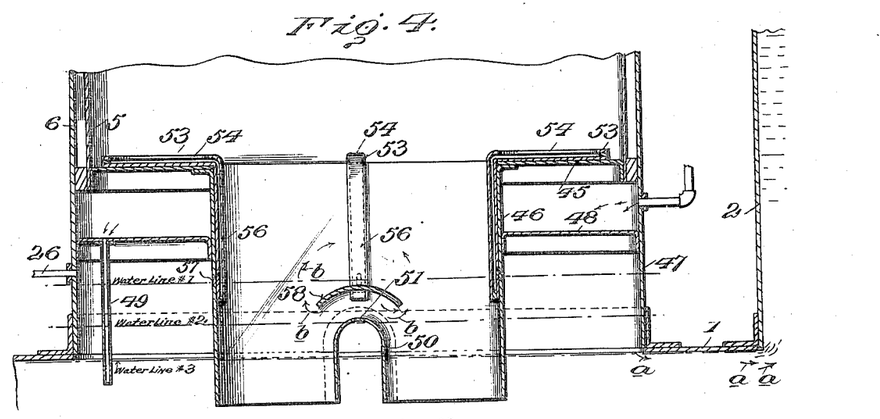
Fig. 4 is a vertical longitudinal section illustrating the preferred form of mold construction.
Figure 5:
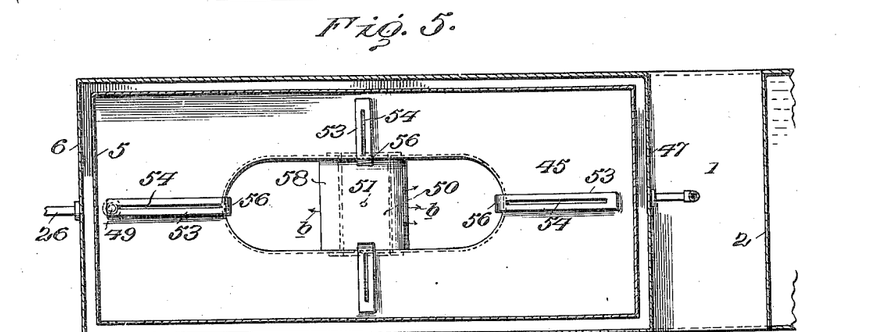
Fig. 5 is a plan view of the construction shown in Fig. 4.

The improvements in the construction of the molds themselves are illustrated in the remaining figures (Nos. 4–9) which, while showing several embodiments of the invention are not designed to be exhaustive thereof. The preferred form of the invention is shown in Figs. 4 and 5. In the molds illustrated in my co-pending applications above referred to, the bottoms are so constructed as to provide auxiliary thawing chambers directly beneath the mold bottom, these chambers being open at the bottom and serving also to deliver agitating air to the water in the molds. This construction makes it necessary to cool the agitating air before introducing it in order to prevent the formation of ice on the under side of the bottom of the mold, which ice would have to be thawed before thawing action could be transmitted through the mold bottom. In common with the molds of the said applications, those illustrated herein are provided with bottom plates 45 having a hole lined by a shell 46, which depends from the bottom, and having also the inclosing wall 47 depending from the mold and preferably forming an extension of the outer mold wall 6. A second bottom plate 48 spaced from the plate 45 provides an auxiliary thawing chamber beneath the mold which has an inlet for thawing fluid and an outlet pipe 49 which, in the forms illustrated in Figs. 4, 6 and 7, drains into the tank having an outlet tube terminating below the lower edge of the inclosing wall 47 and above the lower edge of the depending shell 46. This avoids the necessity above mentioned of cooling the air, since any condensed moisture would be carried out of the auxiliary thawing chamber. The outlet pipe, if terminating within the tank, is carried as above explained, below the lowest air level to prevent moist relatively warm air used for agitation from entering the auxiliary thawing chamber and leaving water of condensation to freeze therein. It is obvious that other thawing fluids might be employed instead of warm air, for instance, warm brine or gas of some sort other than air. An air connection to the auxiliary chamber governed by the simultaneously operable valve controlling mechanism might be provided for blowing out the brine from the auxiliary chamber if brine were used, its retention in the chamber being likely to cause the water within the shell to freeze by the conductive action of the brine. Of course in this case the outlet of the auxiliary chamber would not be into the tank itself. Both the said inclosing wall and shell extend below the bottom of the mold, and the shell terminates below the bottom edge of the inclosing wall 47 and below the top of the shallow tank in the system illustrated. This forms an open bottomed air trapping chamber, as in the molds illustrated in my said co-pending applications, and it is into this chamber that I prefer to deliver the agitating air by means of the pipes 26, 27. The purpose of the extension of the depending shell below the top of the tank, or below the lower edge of the inclosing wall, is to prevent air rejected from one of the molds finding its way into another and causing undue agitation therein. This is likely to happen where the freezing proceeds faster or is more advanced in some molds than in others. The effect of undue agitation is to splash the water over the surface already formed and build up opaque ice above the normal surface. It will be obvious that rejected air would pass out around the lower edge of the inclosing wall 47 and being prevented by the extended shells 46 from passing into another mold would rise to the surface of the water in the tank, or in the stand pipe in the system illustrated herein. Devices for delivering air from the said open bottomed space are provided. These may be a bridge 50 provided with one or more perforations 51 and preferably having its ends open to the bottom of the depending shell 46, or other devices may be employed, for example, such as shown in other figures. In addition to these means for introducing air to the interior of the mold, I provide means controlled automatically by the ice cake as it freezes for introducing agitating air, the arrangement being such that with a constant air pressure the amount of air delivered to the interior of the molds is automatically decreased as stated. A plurality of openings are provided for introducing air into the mold which openings are closed or restricted by the freezing cake, thus proportionately decreasing the air supply. The openings may be arranged in various ways and may be so located as to cause the supply of agitating air to be gradually and uniformly reduced as the cake freezes. I prefer to arrange them symmetrically. In the preferred form (Figs. 4 and 5), I employ tubes 53 located at the bottom of the tank and having air delivery slots 54. These tubes are in communication with the open bottomed air chamber suitably by extensions 56 within the depending shell, the interiors of which are connected with the said air space by a hole 57 through the depending shell and the inner wall of the tube. I prefer to employ four such slotted tubes each extending at right angles to one of the freezing surfaces of the block in the direction in which the ice builds up from the four sides. This will give an evenly graduated reduction of the air supply as the ice thickens, it being obvious that as the ice builds over the slots their area is cut down and the supply of air proportionately reduced since the air pressure is maintained constant.

The operation is as follows: At the beginning of the freeze, the mold is full of water. Air in the open bottomed chamber establishes "water line #1" (Fig. 4) so as to permit the air to escape through the holes 57 into the tube extensions 56 and through the slots 54 from which it passes up along the surfaces of the forming ice, causing a circulation of the water upward near the sides of the tank and down at the center.

In this connection it should be remembered that the density of the water grows less as the temperature falls below 39° and a fraction Fahrenheit until it reaches the freezing point and the coldest part of this freezing chamber will of course be around the walls of the chamber. At this period the water line is too high to permit air to pass to the center of the molds by means of the bridge 50. As the ice cake forms its advancing walls gradually reduce the operative area of the slots 53 and finally close them completely. The water level is then forced by the air down to the level indicated by "water line #2" (Fig. 4) at which point the air is able to escape by means of the bridge 50 and perforation 51 to the center of the mold and will continue to agitate the water moderately until the cake is completely formed, when all the water below the ice cake within the depending shell will be driven down to water line #2 and finally to "water line #3." Excess air would then be rejected and would pass around the lower edge of the inclosing wall 47 and, as above described, would pass as indicated by the arrows a, a, in Fig. 4 up through the stand pipe 2 into the air. A similar action would occur in the system in which the molds are contained in the water tank. To avoid any possibility of the bottom of the completed ice cake being hollowed out by the direct impinging thereon of air delivered through the bridge 50, I prefer to provide a baffle plate 58 above the bridge curved to cause the air to take the circulatory course indicated by the arrows b, b. Of course the perforation 51 is of the size required to supply the proper amount of air to agitate the water remaining unfrozen when the slots are no longer in operation.

Figure 6:
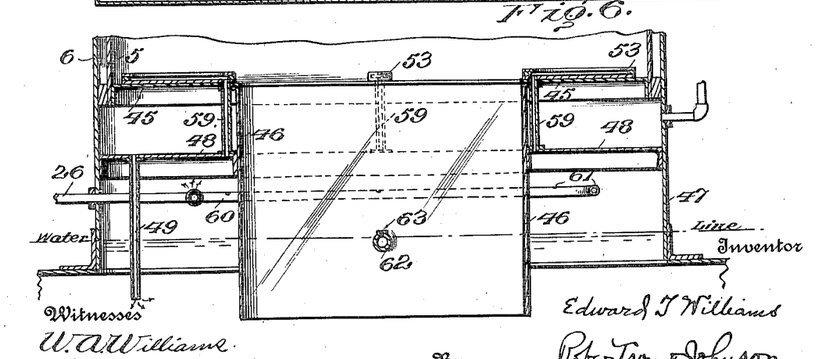
Fig. 6 is a vertical longitudinal section of a modified form of mold bottom.

Fig. 6 illustrates a modification in which the tubes 53 do not have extensions within the tubular shell 46, but are connected to the open bottomed air chamber by tubes 59 passing up through the auxiliary thawing chamber just outside the shell. In this form an air delivery pipe 60 extending into the air chamber and having perforations 61 is employed to distribute the air more uniformly. The bridge in this case is formed by a tube 62 having a delivery nozzle 63. The operation of this form is the same as described above.

Figure 7:
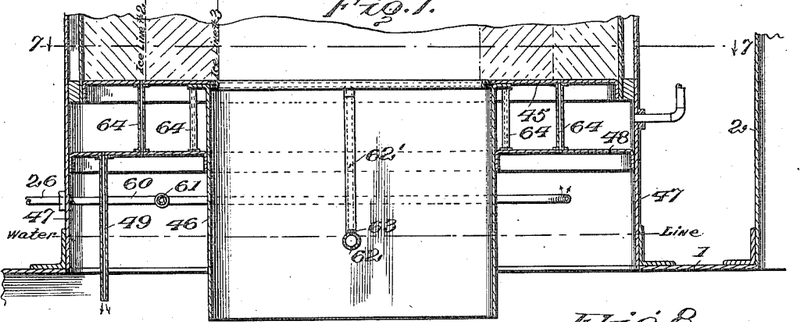
Figure 8:
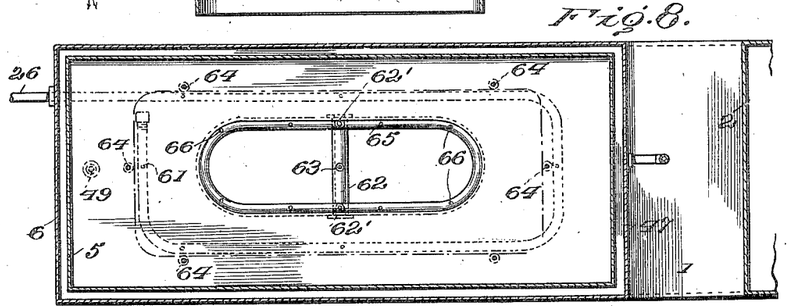
Fig. 8 is a plan view of the construction shown in Fig. 7

Figs. 7 and 8 illustrate another modification in which the bottom of the mold is provided with a plurality of air inlet openings. These are shown as arranged concentrically, but this is not essential and they may be arranged in any manner and provided in any number which may be considered most effective. These openings are connected with the open bottomed air chamber by pipes 64. Further means for delivering agitating air are also provided in the delivery pipe 65 located at the edge of the hole in the bottom of the mold and having perforations 66, in the plane of the bottom plate 45, which direct the air upward. This delivery pipe is connected to the bridge tube 62 at one or both sides by the pipe or pipes 62'. The said bridge tube 62 has also a nozzle 63 as above described. The operation is as described above in connection with Figs. 4 and 5, the air entering by the air delivery tube 60 and perforation 61 passes up through the pipes 64 into the tank and continues to do so until these pipes are closed by the ice cake as indicated in Fig. 7 (see "ice line #2"). The water level is then forced down to the position indicated in Fig. 7 at which point the delivery tube is enabled to deliver air to the interior of the mold until the perforations 66 of the collar are closed by the advancing ice cake (see "ice line #3") and only the nozzle 63 remains open.

Figure 9:
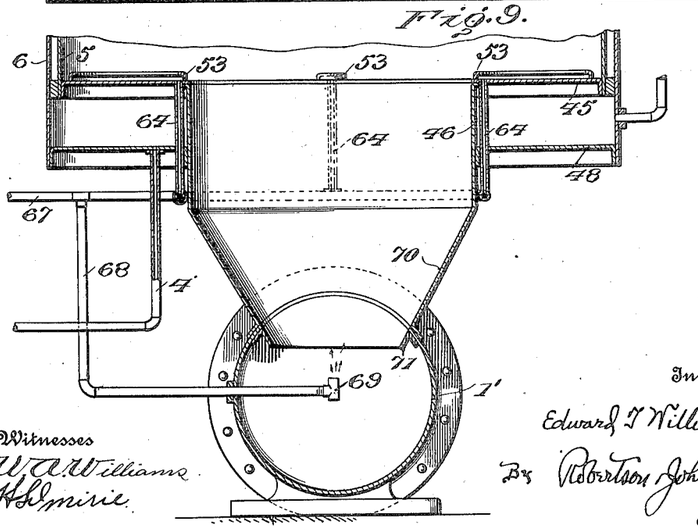
Fig. 9 is a vertical section through another modified form of mold and the pipe line constituting the shallow tank therefor.

Fig. 9 illustrates my invention applied to a mold used where the shallow tank takes the form of a pipe line 1'. This construction is very similar to that illustrated in Fig. 6 having slotted tubes 53, and tubes 64 extending up through the auxiliary thawing chamber to deliver air to said slotted tubes. In this construction there is no open bottomed air chamber, but the air is delivered by the pipe 67 having a branch 68 extending into the tank below the bottom of the mold and terminating in a T 69 having its cross piece vertical to permit sediment to pass through without clogging. The depending shell 46 has a hopper shaped bottom 70 and an extension 71 is provided for it within the tank. This is most conveniently a separate plate or shell and has the same purpose as the extension of the depending shell 46 in the other forms shown, namely, to prevent air rejected from a given mold from escaping into another. This pipe line would of course be connected with a stand pipe as in the system shown above and in my application Ser. No. 569,968, above referred to. It is in effect a narrow tank of convenient shape for use where only a single line of molds is desired. Manifestly the connections in this, as in the case of the other molds, may be those above described, those mentioned in my previous applications, or any other suitable connections.

It will be noted that in all the above forms agitating air is introduced at one time at one part or parts of the mold bottom and at another time at a different part or parts, there being a plurality of distinct delivery devices controlled and some of them brought into operation by the automatic action of the freezing cake.

What I claim as my invention is:

1. Ice making apparatus comprising in combination, a plurality of molds, a plurality of systems for serving said molds with fluids, sets of grouped connections between said systems and particular molds or mold groups, valves in said connections, and means connecting sets of said valves corresponding to a particular mold or mold group for simultaneous operation.

2. Ice making apparatus comprising in combination, a plurality of molds, freezing and thawing means therefor, a system for circulating freezing fluid, a system for circulating thawing fluid, connections between both said systems and the freezing and thawing means for particular molds or mold groups, valves in the said connections, and means connecting the valves corresponding to a particular mold or mold group for simultaneous operation.

3. Ice making apparatus comprising in combination, a water tank, a plurality of upright molds in communication therewith at the bottom, freezing and thawing jackets for said molds, a system of piping for circulating freezing fluid, a system of piping for circulating thawing fluid, connections between the freezing and thawing jackets of individual molds and both said systems, and means for simultaneously controlling the connections between both systems and a given mold.

4. Ice making apparatus comprising in combination, a water tank, a plurality of upright molds in communication therewith at the bottom, freezing and thawing means for said molds, freezing fluid supply and return headers, thawing fluid supply and return headers, connections between pairs of freezing and thawing fluid supply headers and said freezing and thawing means, valves in said supply connections, connections between pairs of freezing and thawing fluid return headers and said freezing and thawing means, valves in said return connections, levers for operating said valves, and means connecting the operating lever of a valve in the supply connections with the operating lever of the corresponding valve in the return connections for simultaneous operation.

5. Ice making apparatus comprising in combination, a water tank, a plurality of upright molds on top of said tank having a water tight connection therewith, said molds having bottoms located above the top of the tank and having holes therethrough, whereby they are in communication with the tank, freezing and thawing means for said molds, auxiliary thawing chambers underneath the molds, freezing fluid supply and return headers, thawing fluid supply and return headers forming systems for circulating freezing fluid and for circulating thawing fluid, connections between both said systems and the freezing and thawing means for particular molds or mold groups, another thawing fluid supply header, connections between said header and said auxiliary thawing chambers at the bottoms of the molds, said headers being grouped at one side of the molds, valves in the various connections specified, and means connecting the valves corresponding to a particular mold or mold group for simultaneous operation.

6. Ice making apparatus comprising in combination, a water tank, a plurality of upright molds arranged in a row or rows and located on top of said tank and having a water tight connection therewith, said molds having holes in their bottoms whereby they are in communication with the tank, freezing and thawing means for said molds, freezing fluid supply and return headers, thawing fluid supply and return headers, an agitating air supply header, said headers being grouped in a substantially vertical plane at one side of the row or rows of molds, connections between a plurality of said headers and the freezing and thawing means of individual molds or mold groups, valves in said connections and means for simultaneously operating the valves corresponding to an individual mold or mold group.

7. Ice making apparatus comprising in combination, a water tank, a plurality of upright molds arranged in rows open at the top and in communication with said tank at the bottom, individual freezing and thawing means for said molds, a pair of freezing fluid supply and return headers, a pair of thawing fluid supply and return headers, the individual freezing and thawing means of the individual molds of a plurality of rows being connected in multiple to a single pair of supply and return headers of each kind, and valves governing the said connections.

8. Ice making apparatus comprising in combination, a plurality of upright molds provided with freezing and thawing jackets and having double bottoms constituting auxiliary thawing chambers separate from said jacket and provided with an inlet for thawing fluid and with an outlet at the bottom of the chamber, means for serving said freezing and thawing jackets with freezing and thawing fluid, and means for supplying thawing fluid to said auxiliary thawing chamber.

9. Ice making apparatus comprising in combination, a water tank, upright molds, freezing and thawing means therefor, said molds having double bottoms constituting auxiliary thawing chambers and having holes therethrough whereby the molds are in communication with the tank and having shells lining said holes, means for delivering thawing fluid to said auxiliary thawing chambers, and outlets from said chambers.

10. Ice making apparatus comprising in combination, a water tank, upright molds, freezing and thawing means therefor, said molds having double bottoms constituting auxiliary thawing chambers and having holes therethrough whereby the molds are in communication with the tank, and having shells lining said holes and depending below the double bottom and having also inclosing walls depending from said double bottoms and forming open bottomed chambers below the molds, means for delivering thawing fluid to said auxiliary thawing chambers, outlets from said chambers, means for delivering air to said open bottomed chambers, and devices for conducting air from said chambers to the water in the molds.

11. Ice making apparatus comprising in combination, a water tank, upright molds in communication therewith, said molds having double bottoms constituting auxiliary thawing chambers and having holes therethrough whereby the molds are in communication with the tank, shells lining said holes and depending below the double bottom, inclosing walls depending below the double bottom and forming with the shells open bottomed chambers, means for delivering air to the water in the molds, means for delivering thawing fluid to the auxiliary thawing chambers, and outlets from said thawing chambers extending below the bottom of the inclosing wall.

12. Ice making apparatus comprising in combination, a water tank, a reservoir in communication therewith, a plurality of upright molds located on the top of said tank and having a water tight connection therewith, freezing and thawing means for said molds, said molds having double bottoms above the top of the tank to provide an auxiliary thawing chamber and a space below it between the bottom of the ice cake and the top of the tank, said bottoms having inclosed holes therethrough and depending shells, means for delivering air to the space between the double bottom and the top of the tank, and devices for conducting air from said space to the water in the mold.

13. Ice making apparatus comprising in combination, a water tank, a reservoir in communication therewith, a plurality of upright molds located on the top of said tank and having a water tight connection therewith, freezing and thawing means for said molds, said molds having double bottoms above the top of the tank to provide an auxiliary thawing chamber, means for delivering thawing fluid to said auxiliary chamber, said bottoms having centrally located holes therethrough lined by shells depending from the bottoms, and means for delivering air to the water in the molds.

14. Ice making apparatus comprising in combination, a water tank, a reservoir in communication therewith, a plurality of upright molds located on the top of said tank and having a water tight connection therewith, freezing and thawing means for said molds, said molds having double bottoms above the top of the tank to provide an auxiliary thawing chamber and a space below it between the bottom of the ice cake and the top of the tank, said auxiliary thawing chamber having an inlet for thawing fluid and an outlet extending below the top of the tank, said bottoms having inclosed holes therethrough and depending shells, means for delivering air to the space between the double bottom and the top of the tank, and devices for conducting air from said space to the water in the mold.

15. Ice making apparatus comprising in combination, a water tank, a plurality of upright molds having bottoms provided with holes whereby they are in communication with said tank, an inclosing wall depending from the bottom of each mold and a shell surrounding said hole, depending from the bottom of the mold and extending below the bottom of the inclosing wall thus forming an open bottomed chamber beneath the mold, and means for introducing agitating air to the water in the molds.

16. Ice making apparatus comprising in combination, a water tank, a plurality of upright molds having bottoms provided with holes whereby they are in communication with said tank, an inclosing wall depending from the bottom of each mold and a shell surrounding said hole, depending from the bottom of the mold and extending below the bottom of the inclosing wall thus forming an open bottomed chamber beneath the mold, means for introducing agitating air to said open bottomed chambers, and devices for conducting it from said chambers into the molds.

17. Ice making apparatus comprising in combination, a water tank, a reservoir in communication therewith, a plurality of upright molds on top of said tank having a water tight connection therewith and having bottoms provided with holes whereby they are in communication with said tank and having depending shells lining said holes and extending below the top of the tank, and means for introducing agitating air to the water in the molds.

18. Ice making apparatus comprising in combination, a water tank, a reservoir in communication therewith, a plurality of upright molds on the top of said tank having water tight connections therewith and having bottoms located above the top of the tank and provided with holes whereby the molds are in communication with the tank, each mold having an inclosing wall depending from the bottom thereof and a shell lining said hole depending from the bottom of the mold and extending below the top of the tank thus forming an open bottomed chamber beneath the mold, means for introducing agitating air into said chamber, and devices for delivering it therefrom to the water in the mold.

19. Ice making apparatus comprising in combination, a mold provided with freezing and thawing means terminating substantially on a level with the bottom of the mold and with a plurality of restricted air inlets in its bottom, and means for delivering air thereto, said inlets being automatically closed by the ice cake as it freezes.

20. Ice making apparatus comprising in combination, a plurality of molds, freezing and thawing means therefor, devices for introducing agitating air to the water in said molds, said devices having restricted orifices located adjacent the limit of the freezing means so as to be automatically closed by the advance thereof, thus diminishing the amount of agitating air delivered to the interior of the mold.

21. Ice making apparatus comprising in combination, a water tank, a plurality of molds in communication therewith at their bottoms, air delivering devices having orifices symmetrically located at the bottom of each mold, a header for delivering air at substantially constant pressure, and connections between said header and delivery devices, said orifices lying in the path of the forming surfaces of the ice cake whereby the supply of air to the water in the molds is automatically and gradually decreased as the ice cake freezes.

22. Ice making apparatus comprising in combination, an upright mold, freezing and thawing means for said mold, and devices for delivering agitating air at different parts of the mold, some of said devices being automatically shut off and another of them being automatically brought into play by the ice cake as it freezes.

23. Ice making apparatus comprising in combination, a water tank, a plurality of molds in communication therewith at the bottom, freezing and thawing means for said molds, devices for delivering air to the interior of the molds at their bottoms adjacent the limit of the freezing means, another device of lesser capacity nearer the axes of the molds for introducing air to the interior of the molds adjacent their bottoms, some of said first named devices being automatically shut off and the device of lesser capacity then brought into play by the ice cake as it freezes.

24. Ice making apparatus comprising in combination, a water tank, a reservoir in communication therewith, a plurality of upright molds located on top of said tank and having a water tight connection therewith, freezing and thawing means for said molds, the bottoms of said molds being located above the top of the tank and being double to provide auxiliary thawing chambers, said double bottoms having holes therethrough whereby the molds are in communication with the tank and shells lining said holes, means for delivering thawing fluid to said auxiliary thawing chambers and outlets therefrom, devices for delivering air to the water in the mold having orifices at different places at the bottom of the mold in the path of the forming ice to be automatically closed thereby.

25. Ice making apparatus comprising in combination, a water tank, a plurality of molds, freezing and thawing means therefor, said molds having double bottoms forming auxiliary thawing chambers and provided with holes whereby the molds are in communication with said tank, means for delivering the fluid to said auxiliary thawing chambers, shells inclosing said holes and depending below the bottoms, said molds having inclosing walls extending below the double bottoms and forming with the shells open bottomed spaces, means for introducing agitating air to said spaces, normally open connections between said spaces and molds whereby the air may pass thereto the outlets of said connections being located in the path of the forming ice cake, other connecting devices between said spaces and molds normally submerged but capable when uncovered of delivering air nearer the center of the mold than said first named devices.

26. Ice making apparatus comprising in combination, a water tank, a plurality of upright molds, freezing and thawing means therefor, said molds having bottoms provided with holes whereby they are in communication with the said tank, said holes being lined by depending shells and said molds having inclosing walls depending therefrom, said bottoms being provided with a plurality of slotted openings, and means to introduce agitating fluid at substantially constant pressure into the space between the bottom and the depending wall and shell, said slots being in communication with the said space to deliver agitating air and lying in the path of the advancing freezing surfaces of the ice cake, whereby their extent is automatically and gradually lessened.

27. Ice making apparatus comprising in combination, a water tank, a plurality of upright molds having bottoms provided with central holes whereby they are in communication with the tank, shells depending from the bottoms of the molds and lining said holes, inclosing walls depending below the bottoms of the molds to form an open bottomed chamber below each mold, slotted tubes for delivering air to the interior of said molds extending along the bottom of each mold, means for delivering air at substantially constant pressure to the open bottomed chambers, and tubes located adjacent said shells for connecting the open bottomed chambers with the inner ends of the slotted tubes.

28. Ice making apparatus comprising in combination, a water tank, a reservoir in communication with said tank, a plurality of upright molds located on the top of the tank and having a water tight connection therewith, freezing and thawing means for said molds, said molds having their bottoms located above the top of the tank and being provided with centrally located holes whereby they are in communication with the water in the tank, depending shells lining said holes and forming open bottomed chambers between the bottom of the mold and the top of the tank, means for delivering agitating air under substantially constant pressure to said open bottomed chambers, four slotted tubes extending along the bottom outward from said hole at right angles to the respective walls of the mold, and tubes for connecting the inner ends of said slotted tubes with the open bottomed chamber.

29. Ice making apparatus comprising in combination, a water tank, a plurality of upright molds having holes in their bottoms whereby they are in communication therewith, depending shells lining said holes and extending down below the bottoms, inclosing walls depending from said bottoms and forming open bottomed chambers, means for delivering air to said open bottomed chambers, a bridge for conducting air from the said open bottomed chambers to the interior of the molds and provided with an outlet for this purpose, and a curved baffle plate located above said outlet.

30. An ice forming mold having double walls constituting a freezing and thawing jacket, and a double bottom constituting a chamber separate from said jacket and provided with an inlet and an outlet, said bottom being provided with a hole lined by a shell depending below it and having also a depending inclosing wall.

31. An ice forming mold having freezing and thawing means, and provided with a bottom and with air delivery tubes having narrow orifices at the bottom of the mold each extending toward the interior of the mold at an angle to a mold wall at substantially the limit of the freezing means for restriction or closure by the ice cake as it freezes.

32. An ice forming mold having freezing and thawing means, a double bottom constituting an auxiliary thawing chamber and having an inlet and an outlet, said bottom being provided with a hole lined by a shell depending below it and having also an inclosing wall forming an open bottomed chamber, and horizontal tubes extending along the bottom and having slots opening upward, and means connecting said chamber and tubes.

33. Ice making apparatus comprising in combination, a water tank, a plurality of upright molds having bottoms provided with central holes through which they are in communication with said tank, an inclosing wall depending from the bottom of each mold and a shell surrounding said hole, depending from the bottom of the mold thus forming an open bottomed chamber beneath the mold, means for introducing agitating air to said open bottomed chamber, devices for conducting said air to the interior of the molds having orifices at the bottom of the molds in the path of the freezing ice cake so as to be automatically closed by the advance thereof and having an inlet from said chamber, and a bridge across said shell having a perforation and having its inlet below the inlet named above and normally submerged.

Signed by me at New York city this 2d day of November 1910.

EDWARD T. WILLIAMS.

Witnesses:
HARRY T. BERNHARD,
JENNIE DUPREE.